United States Patent [19]

Ezzell

[11] Patent Number: 4,462,877
[45] Date of Patent: Jul. 31, 1984

[54] COMPOSITE ION EXCHANGE MEMBRANES

[75] Inventor: Bobby R. Ezzell, Lake Jackson, Tex.

[73] Assignee: The Dow Chemical Company, Midland, Mich.

[21] Appl. No.: 362,227

[22] Filed: Mar. 26, 1982

Related U.S. Application Data

[62] Division of Ser. No. 158,423, Jun. 11, 1980, Pat. No. 4,337,137.

[51] Int. Cl.³ .................. C25B 13/08; C25B 13/05
[52] U.S. Cl. ........................................ 204/98; 204/128
[58] Field of Search ................... 204/296, 98, 128

[56] References Cited

U.S. PATENT DOCUMENTS

| | | | |
|---|---|---|---|
| 4,209,367 | 6/1980 | Seko et al. | 204/98 |
| 4,246,090 | 1/1981 | DeNora et al. | 204/296 |
| 4,253,900 | 3/1981 | Dege et al. | 156/309.3 |
| 4,272,560 | 6/1981 | Baczek et al. | 427/58 |
| 4,313,805 | 2/1982 | Burney et al. | 204/98 |

*Primary Examiner*—John F. Niebling

[57] ABSTRACT

A composite, substantially completely fluorinated film containing ion exchange groups and its use as an ion exchange membrane in an electrolytic cell is described. The membranes are comprised of at least two layers wherein the layers have equivalent weights that differ by less than 150 and contain ion exchange groups.

When each layer contains sulfonyl ion exchange groups the equivalent weight of the two layers differ by less than 250. When the equivalent weight difference exceeds 250, at least one layer has an equivalent weight of less than 1000. The higher equivalent weight layer should face the cathode in an electrolytic cell.

When the first layer contains carboxylic acid ion exchange groups and the second layer contains sulfonyl ion exchange groups, at least one layer has an equivalent weight of less than 1000. The carboxylic acid containing layer faces the cathode in an electrolytic cell.

13 Claims, No Drawings

COMPOSITE ION EXCHANGE MEMBRANES

CROSS-REFERENCE TO RELATED APPLICATION

This is a divisional of application Ser. No. 158,423, filed June 11, 1980, now U.S. Pat. No. 4,337,137.

BACKGROUND OF THE INVENTION

The electrolytic production of chlorine and caustic by the electrolysis of brine has been well known for many years. Historically, diaphragm cells using a hydraulically-permeable asbestos diaphragm, vacuum-deposited onto foraminous steel cathodes, have been widely commercialized. Such diaphragm cells, employing permeable diaphragms, produce NaCl-containing NaOH catholytes because NaCl passes through the diaphragm from the anolyte to the catholyte. Such NaCl-containing caustic is generally of low caustic concentration and requires a de-salting process and extensive evaporation of water to obtain a low-salt, high concentration caustic for industrial purposes.

In recent years, the chlor-alkali industry has focused much of its attention on developing membrane cells to produce low-salt or salt-free, high concentration caustic in order to improve quality and avoid the costly de-salting and evaporation processes. Membranes have been developed for that purpose which are substantially hydraulically-impermeable, but which will permit hydrated Na+ ions to be transported from the anolyte portion to the catholyte portions, while substantially preventing transport of Cl− ions. Such cells are operated by flowing a brine solution into the anolyte portion and by providing salt-free water to the catholyte portion to serve as the caustic medium. The anodic reactions and cathodic reactions are not affected by the use of a membrane cell as opposed to the use of a diaphragm cell.

In addition to the caustic strength being important, two other criteria of the operating cell must also be considered for a complete energy view of the overall process. One is current efficiency, which is the ability of the membrane to prevent migration of the caustic produced at the cathode into the anode compartment; and the second is the voltage at which the cell operates, which is partly determined by the electrical resistance of the membrane. Power efficiency is often used as one term that considers both the current efficiency and cell voltage. It is defined as the product of the theoretical voltage, divided by the actual voltage, multiplied by the actual amount of caustic produced divided by the theoretical amount of caustic that could have been produced at a given current. Thus, it is apparent that power efficiency is reduced by higher cell voltage or by lower current efficiency. The membrane has a direct effect on both. The most common method of comparing cells is to express the operation as kilowatt hours (KWH) of power consumed per metric ton (mt) of product produced. This expression also considers both voltage, higher voltage increasing the quantity KWH, and current efficiency, lower efficiency decreasing the quantity of product produced (mt). Thus, the lower the value KWH/mt, the better the performance of the cell. It is apparent that optimization of a membrane for use in electrolytic chloralkali cells is a trade off between cell voltage which is reflected in membrane electrical resistance, current efficiency and caustic concentration.

It is well known (G. E. Munn, Nafion ® Membranes—Factors Controlling Performance in the Electrolysis of Salt Solutions, The Electrochemical Society Meeting, October, 1977, Atlanta, Ga.) that the current efficiency of a chlor-alkali cell containing a membrane is determined primarily by the surface of the membrane contacting the catholyte. The current efficiency is dependent on the equivalent weight of the membrane in contact with the catholyte and the voltage is dependent on both the thickness of the membrane and the equivalent weight of the membrane. The equivalent weight is the measure of the concentration of ion exchange functional groups in the polymer membrane and is simply the weight of the polymer in the acid form required to neutralize one equivalent of base. The above publication discloses that lower equivalent weights (eq. wts.) have lower electrical resistance (and thus lead to lower cell voltage), but that higher eq. wts. are required to obtain sufficient negative ion rejection and thus acceptable current efficiency. It is well known and discussed in the publication that voltage drop across the membrane is directly dependent on thickness; a thin film being desirable for minimum voltage drop. It thus follows that ideal membranes would be very thin films having higher eq. wts. (1500–2000 for sulfonic acids membranes of the prior art).

U.S. Pat. No. 3,909,378 teaches a method to take advantage of the increased current efficiency associated with high eq. wts. without absorbing the full voltage penalty associated with these materials. This patent teaches a composite membrane formed by laminating a thin, high eq. wt. film to a thicker, lower eq. wt. film. The thin, higher eq. wt. side of the film faces the catholyte in the cell thus resulting in current efficiency associated with the higher eq. wt. and voltage associated with the thin layer plus the minimal voltage of the lower eq. wt. layer. The patent further teaches that the eq. wts. of the polymers fall within the range of 1000–2000 or even greater and that the eq. wt. difference between the low and high eq. wt. portions of the composite film should be at least 250 and preferably 400. The patent teaches polymers having sulfonyl type ion exchange groups and that the structure linking these groups to the main polymer chain are not critical. The sulfonyl ion exchange groups, according to the patent may be the sulfonamide form or in the sulfonic acid form.

U.S. Pat. Nos. 3,784,399 and 4,085,071 teach formation of a barrier layer, facing the catholyte, on a single polymer film by reacting ammonia or N-substituted amines with one face of a sulfonyl functional polymer to form sulfonamide ion exchange sites. The main distinguishing feature of these patents from U.S. Pat. No. 3,909,378 is that the barrier layer facing the catholyte is introduced by chemical modification on a sinqle eq. wt. film rather than by lamination of a barrier film to a support film.

U.S. Pat. No. 4,151,053 also teaches having barrier layers on the catholyte face of membranes to achieve enhanced current efficiency without substantial voltage penalties. The main distinguishing feature of this patent and U.S. Pat. Nos. 3,090,378; 3,784,399 and 4,085,071 is that the barrier layer has carboxylic acid ion exchange groups of the general structure ∼OCF$_2$COOM where M is hydrogen; ammonium; quaternary ammonium, particularly quaternary ammonium having a molecular weight of 500 or less; and metallic atoms, particularly alkali or alkaline earth metals. This patent teaches and claims two methods of achieving the barrier layer. One is a uni-layer film wherein the eq. wt. of the cation exchange groups are uniform and on one surface, to a depth of at least about 100Å, the sulfonyl groups have been substantially chemically converted to carboxylic acid groups. The second method to achieve a barrier layer is to use a two-ply film in which a first film having a higher eq. wt. value and a second film having a lower eq. wt. value are combined. The first film having the higher eq. wt. is chemically converted from sulfonyl groups to all, or at least part, carboxylic acid groups and faces the catholyte in the cell. A preferred embodiment is where only a thin stratum on one side of the first film is converted to carboxylic acid and the opposite side is laminated to the second film. The thin stratum of at least 100Å faces the catholyte in the cell. The patent teaches that each film of the composite membrane should have eq. wts. in the range of 1000 to 2000 and that the first film, the high eq. wt. film, should have an eq. wt. at least 150 higher than the second film.

All of the aforementioned patents use as starting materials sulfonyl containing fluoropolymers wherein the sulfonyl is generally contained on a pendant chain. The useful polymers and monomer precursors for these type materials are described in U.S. Pat. No. 3,282,875. In each patent the preferred sulfonyl containing fluoropolymer is described as derived, by polymerization, from the monomer

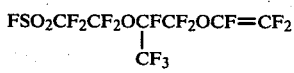

disclosed in the above patent. The polymers are generally copolymers of the above monomer and tetrafluoroethylene. These copolymers have become well known in the art and are sold under the tradename of Nafion ® by E. I. duPont Company. These materials are so well known and widely evaluated as membranes in chlor-alkali cells that the properties of these materials, such as useful eq. wt. ranges, water absorption and the like, have become accepted as the properties of sulfonic acid containing fluorocarbon polymers. In general, useful eq. wts. for these materials in chlor-alkali cells is not below about 1000 to 1100. Below these values water absorption increases dramatically and physical integrity falls sharply. For eq. wts. above about 1800–2000, electrical resistance becomes so great as to render the materials impractical in chlor-alkali cell use. Preferred eq. wt. ranges are from about 1100 to about 1500.

U.S. Pat. No. 4,065,366 teaches the use of single layer carboxylic acid membranes in chlor-alkali cells. This patent teaches useful equivalent weight ranges that vary from about 500 to about 2000; the lower range being significantly lower than that claimed for sulfonic acid membranes. The usefulness of these membranes in chlor-alkali cells is taught as being associated with concentration of functional group in membrane (eq. wt.), water absorption of the membrane and glass transition temperature of the polymer. The most preferable range for the concentration of the carboxylic acid group in the polymer is given as 1.1 to 1.7 meq./g of dry polymer (about 600 to about 900 eq. wt.). Excellent current efficiencies are obtained with these relatively low eq. wt. carboxylic acid polymers at high caustic concentrations (30–40%), but the voltages reported in the examples are relatively high for the thicknesses reported (200 microns) and the current density of the cells (20A/dm²).

BRIEF DESCRIPTION OF THE INVENTION

A composite, substantially completely fluorinated film containing ion exchange groups and its use as an ion exchange membrane in an an electrolytic cell is described. The membranes are comprised of at least two layers wherein the layers have equivalent weights that differ by less than 150 and contain ion exchange groups. When each layer contains sulfonyl ion exchange groups the equivalent weight of the two layers differ by less than 250. When the equivalent weight difference exceeds 250, at least one layer has an equivalent weight of less than 1000. The higher equivalent weight layer should face the cathode in an electrolytic cell.

When the first layer contains carboxylic acid ion exchange groups and the second layer contains sulfonyl ion exchange groups, at least one layer has an equivalent weight of less than 1000. The carboxylic acid containing layer faces the cathode in an electrolytic cell.

DETAILED DESCRIPTION OF THE INVENTION

Novel composite ion exchange membranes have been developed. The membranes are made by combining at least two different films of substantially fluorinated polymers containing ion exchange functional groups. The ion exchange functional groups may be the same or different. The main defining feature of the membranes of the present invention as opposed to composite membranes of the prior art is that at least one film of the composite membrane has an equivalent weight of less than about 1000. As a preferred embodiment, the equivalent weight difference between the two films should not exceed about 250. As a more preferred embodiment, the ion exchange functional groups of each film should be different and the equivalent weight difference between the two films should not exceed about 150. It is within the scope of the invention and in fact in some cases preferable, that the eq. wt. of the first film, the film facing the catholyte in chlor-alkali electrolytic cells, can be equal to or even less than the eq. wt. of the second film.

Several criteria, aside from the criteria of cell performance, are necessary for use of polymers as membranes in electrolytic cells. When the polymers are used as films, which are conveniently made by melt extrusion of the like, on commercial scale, the physical and chemical properties of the film must withstand the environment of the cell. This severely restricts the materials useful in the harsh environment of a chlor-alkali cell. The cell is divided by the membrane into two compartments, an anolyte compartment, wherein chlorine gas is made and evolved from a anode; and a catholyte compartment wherein caustic is produced at a cathode. These cells normally operate at temperatures of from about 70° C. up to temperatures of about 100° C. and are expected to continuously operate at these conditions for many months and even years. This chemical environment of strong, hot caustic on one side and a highly oxidative environment on the other virtually eliminates the use of most organic polymers as membranes. The constant churning of gas being evolved through the liquid electrolyte solutions in the cell severely limits the physical properties that a film must have in order to meet the lifetime requirements of the cell. It is known to physically support polymer films on such materials as polytetrafluoroethylene scrim to aid in meeting the life requirements, but even then, the film must be physically sound to a large degree. Any holes or tears that develop in the film lead to contamination of the caustic product in the catholyte with salt from the anolyte and even worse, can lead to explosive mixtures of hydrogen in chlorine when cathodes are used that produce hydrogen along with attendant production of chlorine on the anode.

It is known in the art that fluoropolymers, in general, meet the chemical requirements of the chlor-alkali cell. These fluoropolymers can be substituted with other halogen atoms such as chlorine or bromine that are not reactive in the cell environment, but, although contrary to some teachings, these polymers should not contain hydrogen atoms on carbons that make up the main polymer backbone. Carbon-hydrogen bonds are chemically attacked by both oxidation from the anolyte components and caustic in the catholyte. Chemical attack on the polymer backbone can lead to reduced molecular weight by carbon-carbon bond cleavage and thus to severe damage to film physical properties.

Physical properties of a polymer are dependent on polymer structure. A highly crystalline fluoropolymer made from simple, unsubstituted monomers such as tetrafluoroethylene is tough, but has extremely high melting or softening temperatures. Fabrication is difficult or near impossible by simple techniques such as melt extrusion. Homopolymers of long chain, terminal fluorocarbon olefins which result in polymers having many pendant groups are difficult to prepare because of having a relatively unreactive olefin site and when formed are often low molecular weight, waxy, amorphous solids having little, if any, plastic quality. Materials of this nature are useless as films. Copolymers of the two type monomers described above often have properties, better than the homopolymers. Copolymers of tetrafluoroethylene and perfluoroalkyl vinyl ethers (U.S. Pat. No. 3,896,179) have excellent physical properties and can be conveniently melt fabricated into films. Thus, polymers with a limited number of pendant groups can maintain most of the favorable physical characteristics of the parent (no long pendant groups) polymer and also lend itself to simple fabrication. The physical strength of a polymer depends on both the number of pendant groups and the size or number of atoms and arrangement of atoms (generally carbon and oxygen in the chain) that make up the pendant group. Thus, the commercial, composite membranes of the prior art are based on sulfonyl containing copolymers of tetrafluoroethylene and

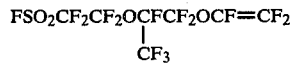

The membranes are made by laminating a thin layer of 1500 eq. wt. polymer onto a thicker layer of 1100 eq. wt. polymer which lends mechanical strength while adding little electrical resistance (see G. E. Mull reference in Background of the Invention). Decreasing the equivalent weight of the thicker support layer would result in somewhat lower electrical resistance, but, because of the added number of pendant groups, would decrease the structural support needed for the thin, higher eq. wt. layer. Sulfonyl containing polymers having shorter pendant groups than those of the prior art have excellent physical properties and cell performance characteristics at eq. wts. considerably lower than those of the prior art.

The eq. wt and the hydration per functional group of a polymer used as a membrane in a chlor-alkali cell have a direct influence on both of the quantities, voltage and current efficiency, that determine the overall efficiency at which a cell operates. The water of hydration per functional group, in effect, determines the nature and the size of the paths through which ions must travel to pass through the membrane. Excessive hydration allows more ions to penetrate into the membrane. Penetration of the membrane by hydroxide ion leads to loss in current efficiency. Excessive hydration leads to transport of hydroxide from catholyte to anolyte and thus a loss in current efficiency. Equivalent weight determines the number of sites available to transport the sodium ions from the anolyte to the catholyte. At a given applied current to the cell, a specific number of ions must be transported for cell operation. Lower eq. wt. means a larger number of sites for transport and thus a lower electrical potential is required to drive the ions.

Sulfonic acid membranes of the prior art which have long pendant chains separating the polymer backbone from the functional group, hydrate to such a large degree that equivalent weights of as low as 1100 to 1200 are not practically useable as barrier layers in chlor-alkali cells. Sulfonic acid polymers having shorter pendant groups hydrate less per functional group at given eq. wt. than do the polymers of the prior art. Exemplary, composite sulfonic acid membranes in the present invention are copolymers of tetrafluoroethylene and the monomer $FSO_2CF_2CR_2OCF\!=\!CF_2$ as well as terpolymers of the above two monomers and of the general structure $ROCF\!=\!CF_2$ where R is a straight or branched substantially fluorinated alkyl chain which may be interrupted by oxygen atoms. Polymers formed from combinations of the above monomers hydrate less at a given equivalent weight and perform superior to the sulfonic acid polymers of the prior art in chlor-alkali cells. Thus a 1240 equivalent weight, short pendant chain polymer from above operates at equal or better current efficiency than a 1500 equivalent weight polymer from the prior art and has lower electrical resistance per unit thickness. A laminate of the above 1240 equivalent weight polymer onto a 1100 equivalent weight polymer of the prior art surprisingly operates in a chlor-alkali cell superior to a laminate of a 1500 eq. wt polymer of the prior art onto the same 1100 equivalent weight film even though the equivalent weight difference is only 140 as opposed to the minimum difference of 250 and the preferred difference of 400 taught in U.S. Pat. No. 3,909,378.

In another example of the present invention, a composite membrane formed by laminating a film of the same 1240 equivalent weight material as above onto an 860 eq. wt. copolymer and tetrafluoroethylene and $FSO_2CF_2CF_2OCL\ CF_2$ and then hydrolyzing to obtain the sulfonic acid salt was shown to be superior to the composite 1500 eq. wt. onto 1100 eq. wt. membrane of the prior art. The material had excellent physical strength and gave equal or better current efficiency and better cell voltage on a unit thickness basis than the composite membrane of the prior art. This was surprising since U.S. Pat. No. 3,909,378 teaches that the low eq. wt. layer should have an eq. wt. of at least 1000. The main feature of this composite, sulfonic acid membrane is the fact that one layer of the membrane has an equivalent weight of less than 1000.

The composite sulfonic acid membranes of the present invention (1) have a barrier layer, the layer facing the catholyte, that has a lower water of hydration per functional group than the second layer, (2) should not have an eq. wt. exceeding about 1300, (3) the eq. wt. difference between the two layers can be less than about 250 and even 150 and the eq. wt. of the second layer can be less than 1000 but perferably not less than about 750. A preferred embodiment is where the second layer has an eq. wt. of not more than 1300 and does not exceed one-third of the total thickness of the composite membrane. A more preferred embodiment is where the minimum possible eq. wt. is used for both layers while still preserving sufficient mechanical properties and cell performance. In this embodiment, the second layer has an eq. wt. in the range of 800 to about 1000 and the first layer, the barrier layer, has an eq. wt. of from about 1100 to about 1300. It is entirely within the scope of the present invention to add mechanical support to the membrane by introducing a third material in the form of a fiberous mat or a woven fabric or scrim. When support is added it is preferred that the support material be incorporated in the second film or layer of the composite membrane.

In another embodiment of the present invention, the barrier layer of the composite membranes are made from fluoropolymers having carboxylic acid functional groups or a combination of carboxylic and sulfonic acid functional groups. These type membranes are particularly desirable when the caustic-product from the cell is to be evaporated and thus higher concentrations from the cell result in less energy required for evaporation. It is particularly advantageous that the second layer of these composite membranes be sulfonic acid functional fluoropolymers. Use of carboxylic functional fluoropolymers for the second layer, the layer facing the anolyte, would not result in having large differences in hydration between the two layers unless extremely low eq. wt. polymers were used. Use of these type polymers would result in mechanically inferior properties for the support layer. Use of higher eq. wt. second layers to attain improved mechanical support would essentially defeat the purpose of having a composite membrane and render the materials similar in cell performance properties to a single film carboxylic acid membrane. A second disadvantage is that any excursion to a low pH in the anolyte compartment of the cell would lead to decreased ionization of the carboxylic acid group on the anolyte face of the membrane and thus to higher cell voltage. The novel and surprising feature these composite, sulfonic acid-carboylic acid, membranes is that the eq. wt. of the barrier layer is preferably no more than 150 higher, the same or lower than the eq. wt. of the second layer, the sulfonic acid functional layer facing the anolyte in the cell. Composite, sulfonic acid-carboxylic acid functional membranes are known in the prior art (U.S. Pat. No. 4,151,053). In these prior art membranes it is specified that both layers should have equivalent weights falling in the range of from 1000 to 2000 and preferably from 1000 to 1500. It is further specified that the barrier layer should have an eq. wt. at least 150 greater than the second layer. This means that for the minimum eq. wt. of the second layer of 1000, the barrier layer would necessarily have to be at least 1150. The eq. wt. of the barrier layer of this embodiment of the present invention should not exceed 1100. The eq. wt. range for the barrier layer is from about 500 to about 1100 and more preferably from about 550 to about 1000. The eq. wt. range for the second layer is from about 750 to about 1100 and more preferably from about 800 to about 1100 and most preferably from about 800 to about 1000. It is within the scope of the present invention that the eq. wt. difference between the two layers can exceed 150, but only when the eq. wt. of at least one layer is less than 1000. It is preferable to minimize the thickness of the barrier layer since this is the layer having the higher electrical resistance. This layer can be as small as 100Å, but is preferably about 0.1 to 0.5 mil and at most should not exceed about one-third to about one-half of the total membrane thickness. Use of lower equivalent weight barrier layers in the present invention results in improved composite membranes compared to the sulfonic acid-carboxylic acid composite membranes of the prior art. The composite membranes of the present invention which have a carboxylic acid barrier layer and a sulfonic acid second layer are an improvement over single layer carboxylic acid membranes of the prior art. The entire membrane is the barrier layer in single layer membranes and thus the voltage advantage of having extremely thin barrier films as well as mechanically sound structures can not be achieved.

From the standpoint of manufacture, it is particularly convenient to make composite membranes as opposed to single film membranes wherein one face of the membrane is chemically modified to produce a barrier stratum such as in U.S. Pat. Nos. 3,784,399, 4,085,071 and 4,151,053. Chemical reactions on polymers are difficult especially when careful control of the depth and extent of reaction is necessary on a polymer film. In addition to the normal kinetic characteristics of the particular reaction involved, diffusion rates of the reactants into the polymer structure must also be considered and in many cases is the controlling factor. Production of reproducible membranes by this technique requires careful control and is subject to errors that can result in irretrievable loss of expensive polymer materials. Production of films from polymers that already have the desired functional groups can be done by standard and well known methods such as melt extrusion. Composite membranes can be made by either forming two films and laminating these together or can be formed by coextrusion of the two layers.

Included in the scope of the present invention is combining two films, one of which has had one surface chemically converted from sulfonyl to carboxylic acid or derivative. The side opposite the carboxylic acid function, which still contains sulfonyl function, is laminated to the second film containing sulfonyl functionality. Also included in the scope is combining two sulfonyl functional films and then chemically converting all or part of the sulfonyl functional groups in the first film to carboxylic acid functional groups. The carboxylic acid surface of the composite faces the catholyte in the operating cell. In these embodiments the equivalent weight of the first film is less than, equal to or no more than 150 higher than the equivalent weight of the second film. While these techniques do have the disadvantage of requiring careful control to accomplish the chemical conversion reproducibly, the first does not suffer the full disadvantage since only a limited amount of material, the material for the thin first layer, is subject to loss. These techniques can be advantageous when polymers containing the two different, sulfonic acid and carboxylic acid, functional groups are not readily available. Otherwise, the technique of combining the two, separate (the carboxylic acid functional polymer and the sulfonic acid functional polymer films) to form the composite membrane is the preferable method.

In the composite membranes of the present invention, the barrier layer or stratum preferably has a lower water of hydration per functional group than does the second layer. Water of hydration per functional group is determined by boiling a dry polymer film in water for thirty minutes and measuring, by weighing, the "Standard Water Absorption" and from this value calculating the moles of water absorbed per equivalent weight of polymer (W. G. F. Grot, et al, Perfluorinated Ion Exchange Membranes, 141st National Meeting, The Electrochemical Society, Houston, Tex., May, 1972). In each embodiment of the membranes of the present invention, the maximum limit in equivalent weight for the barrier layer is lower than the maximum limits set out in the prior art. Only when the eq. wt. of at least one of the layers has a value less than 1000 can the eq. wt. difference exceed 150.

EXAMPLE 1

A terpolymer film having an equivalent weight of 1240 and a thickness of 8 mil was prepared by polymerizing tetrafluoroethylene, $FSO_2CF_2CF_2OCF_2=CF_2$ and $ClCF_2CF_2CF_2=CF_2$ and then hydrolyzing to the sodium sulfonate form using caustic in alcohol. The ratio of the latter two monomers was 8:1. The membrane was converted to the acid form by soaking in dilute hydrochloric acid, dried and then soaked for 30 minutes at 25° C. in a thirty weight % solution of triethanolamine in water. The membrane was then air dried and tested in a small electrolytic cell. The cell had an anode and a cathode with the ion exchange membrane sandwiched therebetween, thus separating the cell into an anode chamber and a cathode chamber. Each electrode had a square shape and had an area of 8.63 square inches. Each electrode had a solid, metal stud welded to it. Each stud passed through a wall of the cell and was provided with leak proof seals. Both studs were connected to a power supply. The stud connected to the anode was constructed of titanium, while the stud connected to the cathode was constructed of steel. The anode, itself, was an expanded titanium mesh screen coated with a $RuO_2$-$TiO_2$ mixture, while the cathode was constructed from woven steel wires.

The anode chamber was filled with a saturated NaCl brine solution (approximately 25 weight percent NaCl) and the catholyte chamber was filled with a caustic solution having approximately the same NaOH concentration as the intended cell operation produced. The cell was energized by applying a constant current of approximately 8.63 amps, to give a current density of 1.0 amps per square inch of electrode area. A saturated brine solution (approximately 25 weight percent NaCl) was flowed into the anode chamber at a rate sufficient to maintain the concentration of the anolyte leaving the cell at approximately 17-20 weight percent NaCl. Deionized water was flowed into the catholyte chamber, in a similar manner, at a rate sufficient to maintain the catholyte leaving the cell at a desired NaOH concentration. During the evaluation of each membrane, the NaOH concentration was varied in order to determine the cell operation over a range of caustic concentrations.

The temperature of the cell was controlled throughout each evaluation at about 80° C. by means of an immersion heater connected to a thermocouple inserted into the anolyte chamber. During the evaluation of each membrane the cell voltage was constantly monitored by measuring the difference in voltage potential between the anode stud and the cathode stud. For each evaluation, the cell was operated for several days to reach equilibrium. Then current efficiency was determined by collecting the catholyte leaving the cell for a given period of time, usually 16 hours, and determining the amount of NaOH actually produced, as compared to the amount theoretically produced at the applied current. The membrane operated in the above manner at 3.31 volts at 12% caustic at a current efficiency of 91.3%. The voltage at 20% caustic was 3.25 and the current efficiency 82.6% and at 32% caustic the voltage was 3.30 and the current efficiency 73.7%.

The water absorption was determined for the membrane by first drying the membrane film in the $SO_3H$ form for 16 hours at 110° C., weighing the sample, boiling the sample for 30 minutes in water, blotting the surface dry with towels and then reweighing the film. The difference in weight represented the amount of water absorbed by the film and is commonly referred to as the "Standard Water Absorption". The water absorption per functional group was then determined by calculating the moles of water that one equivalent of the polymer absorbed. In this manner the hydration of the membrane was determined to be 13.8 moles of water per sulfonate equivalent.

EXAMPLE 2

A 3.5 mil film of the polymer of Example 1 in the sulfonyl fluoride form ($-SO_2F$) was thermally laminated onto a second film having a thickness of 7 mils, an equivalent weight of 860 and prepared by copolymerizing tetrafluoroethylene and $FSO_2CF_2CF_2OCF=CF_2$. The composite film was then converted to the acid form by hydrolysis in base and neutralization with acid. The film was then evaluated as described in Example 1 with the 1240 equivalent weight layer facing the catholyte. The cell operated from 3.07 to 3.09 volts over a caustic strength range of from 12% to about 20% caustic. The current efficiency was essentially the same as in Example 1. The 860 equivalent weight second film, in the acid form, was determined to have a hydration of 23.9 moles of water per equivalent of functional group.

COMPARATIVE EXAMPLE 2

A composite membrane of the prior art composed of a first film 1.0 mil thick and having an equivalent weight of 1500 and a hydration of about 15 moles of water per sulfonic acid functional group and a second film 5.0 mil thick and having an equivalent weight of 1100 and a hydration of about 22 moles of water per sulfonic acid equivalent was evaluated as in Example 1. The cell voltage was about 3.1 volts over a range of 12 to 20% caustic and the current efficiency varied from 89.5% at 12% NaOH to 80% at 20% NaOH. This membrane was about equal in voltage to the membrane of Example 2 even though the barrier layer thickness was only 28% as great. Clearly the membrane of Example 2 is superior in voltage, at comparable thicknesses, and in current efficiency at comparable caustic concentration.

EXAMPLE 3

A composite membrane is prepared by laminating the sulfonyl fluoride form of a 3.5 mil film of the polymer of Example 1 to 4 mil film having an 1100 equivalent weight and being the same polymer as the second layer of the composite membrane described in Comparative Example 2. The membrane operates in the cell of Example 1 at a voltage essentially the same as that of the cell in comparative Example 2 even though the thickness is greater and at a current efficiency latter than comparative Example 2 and equal to that of Example 2.

EXAMPLE 4

A composite film is prepared by laminating a 2 mil film of an 820 equivalent weight copolymer of tetrafluoroethylene and $CH_3OOC(CF_2)_3OCF{=}CF_2$ onto a support layer the same as the second film of Example 2. The composite film is then converted to the salt form by hydrolysis in aqueous alcoholic base. Evaluation of the film in a cell, with the carboxylic acid face towards the cathode, demonstrates that the membrane operates at about the same efficiency as a film made of the carboxylic acid polymer alone, but at a substantially lower voltage than an equal thickness of the carboxylic acid polymer. The current efficiency is about 90% when the catholyte contains 35% caustic. The composite film has excellent mechanical properties.

EXAMPLE 5

A composite membrane was prepared by thermally laminating a 3 mil film of a 770 equivalent weight polymer made from the monomers in Example 1 to a 6.5 mil film of a 1000 equivalent weight polymer made from the monomers in Example 2. The composite film was then hydrolyzed from the $SO_2F$ form to the $SO_3Na$ form using caustic in a boiling water-alcohol mixture. The film was then converted to the acid form by soaking in dilution of HCl, washed with water and then dried overnight at 110° C. in a vacuum oven. The film was then converted to the $SO_2Cl$ form by boiling, at reflux, for 20 hours in a 1:1 mixture of phosphorus pentachloride and phosphorus oxychloride. The face of the membrane having the low equivalent weight (770) was then converted to carboxylic acid functionality using 57% hydroiodic acid at 80° C. as described in U.S. Pat. No. 4,151,053. The film was then hydrolyzed using caustic in a ethanol-water mixture, converted to the acid form, dried and evaluated, with the carboxylic acid surface facing the cathode, in the cell described in Example 1. The cell operated at a voltage from 3.06 to 3.35 at caustic strengths varying from 25 to 35% NaOH. The current efficiency was 82% at 35% NaOH and the caustic solution contained 55 ppm sodium chloride.

COMPARATIVE EXAMPLE 5

The 770 equivalent weight film of Example 5 was hydrolyzed to the $SO_2Na$ form using caustic in water and alcohol, then converted to the acid form, dried and evaluated as described in Example 1. The current efficiency was 79% at 95% NaOH and the caustic solution contained 4000 ppm sodium chloride.

I claim:

1. A process which comprises electrolyzing an aqueous electrolyte between a pair of electrodes separated by a substantially completely fluorinated composite ion exchange membrane having two layers differing in equivalent weight by less than 150.

2. The process of claim 1 wherein the aqueous electrolyte is an alkali metal halide solution.

3. The process of claim 1 wherein at least one of the electrodes is a cathode and the ion exchange membrane layer having the higher equivalent weight faces the cathode.

4. A process comprising electrolyzing an aqueous electrolyte between a pair of electrodes separated by a substantially completely fluorinated composite ion exchange membrane having sulfonyl ion exchange functionality and having two layers differing in equivalent weight by less than 250.

5. The process of claim 4 wherein at least one of the electrodes is a cathode and the ion exchange membrane layer having the higher equivalent weight faces the cathode.

6. The process of claim 4 wherein the aqueous electrolyte is a alkali metal halide solution.

7. A process which comprises electrolyzing an aqueous electrolyte between a pair of electrodes which are separated by a substantially completely fluorinated composite ion exchange membrane having a first layer containing carboxylic acid ion exchange groups and a second layer containing sulfonyl ion exchange groups, wherein at least one layer has an equivalent weight of less than 1,000.

8. The process of claim 7 wherein the aqueous electrolyte is an alkali metal halide solution.

9. The process of claim 7 wherein the first layer of the ion exchange membrane faces the cathode compartment.

10. The process of claim 7 wherein the first layer has an equivalent weight of less than 1,000.

11. A process comprising electrolyzing an aqueous electrolyte between a pair of electrodes which are separated by a substantially completely fluorinated composition exchange membrane having a first layer containing sulfonyl ion exchange functionality and a second layer containing sulfonyl ion exchange functionality, wherein at least one layer has an equivalent weight of less than 1,000 and the two layers differ in equivalent weight by at least 250.

12. The process of claim 11 wherein the aqueous electrolyte is an alkali metal halide solution.

13. The process of claim 11 wherein in at least one of the electrode is a cathode and the ion exchange membrane layer having the higher equivalent weight faces the cathode.

* * * * *

UNITED STATES PATENT AND TRADEMARK OFFICE
CERTIFICATE OF CORRECTION

PATENT NO. : 4,462,877
DATED : July 31, 1984
INVENTOR(S) : Bobby R. Ezzell

PAGE 1 OF 2

It is certified that error appears in the above—identified patent and that said Letters Patent is hereby corrected as shown below:

Col. 2, line 10; "thickeness" should be --thickness--.

Col. 2, line 55; "sinqle" should be --single--.

Col. 4, line 7; "an" should be deleted.

Col. 4, line 48; "of" should be --or--.

Col. 4, line 55; "a" first occurrence, should be -- an --.

Col. 5, line 21; "to" should be --do--.

Col. 6, line 33; "R" in the formula should be --F--.
The formula should read $--FSO_2CF_2CF_2OCF=CF_2--$.

Col. 6, line 59; "L" in the formula should be --F--.
The formula should read $--FSO_2CF_2CF_2OCFCF_2--$.

Col. 7, line 10; "perferably" should be --preferably--.

Col. 7, line 53; "acid-carboylic" should be --acid-carboxylic--.

UNITED STATES PATENT AND TRADEMARK OFFICE
CERTIFICATE OF CORRECTION

PATENT NO. : 4,462,877

DATED : July 31, 1984

INVENTOR(S) : Bobby R. Ezzell

It is certified that error appears in the above—identified patent and that said Letters Patent is hereby corrected as shown below:

Col. 9, line 26; delete "$FSO_2CF_2CF_2OCF_2=CF_2$" and insert --$FSO_2CF_2CF_2OCF=CF_2$--.

Col. 9, line 27; delete "$ClCF_2CF_2CF_2=CF_2$" and insert --$ClCF_2CF_2CF_2OCF=CF_2$--.

Col. 11, line 6; delete "latter" and insert --better--.

Col. 12, line 1; "95%" should be --9.5%--.

Col. 12, line 26; "a" should be --an--.

Col. 12, lines 44-45; "composition" should be --composite ion--.

Signed and Sealed this

Twenty-third Day of April 1985

[SEAL]

Attest:

DONALD J. QUIGG

Attesting Officer     Acting Commissioner of Patents and Trademarks